United States Patent
Knipper et al.

(10) Patent No.: US 10,767,769 B2
(45) Date of Patent: Sep. 8, 2020

(54) ELECTROMAGNETIC VALVE DEVICE AND USE THEREOF

(71) Applicant: ETO Magnetic GmbH, Stockach (DE)

(72) Inventors: Karsten Knipper, Öhningen-Wangen (DE); Witold Bruczuk, Wroclaw (PL); Mariusz Bunio, Zerniki Male (PL)

(73) Assignee: ETO Magnetic GmbH, Stockach (DE)

( * ) Notice: Subject to any disclaimer, the term of this patent is extended or adjusted under 35 U.S.C. 154(b) by 0 days.

(21) Appl. No.: 16/062,921

(22) PCT Filed: Nov. 23, 2016

(86) PCT No.: PCT/EP2016/078513
§ 371 (c)(1),
(2) Date: Jun. 15, 2018

(87) PCT Pub. No.: WO2017/102270
PCT Pub. Date: Jun. 22, 2017

(65) Prior Publication Data
US 2019/0011054 A1 Jan. 10, 2019

(30) Foreign Application Priority Data

Dec. 16, 2015 (DE) ............... 20 2015 106 864 U

(51) Int. Cl.
*F16K 11/04* (2006.01)
*F16K 31/42* (2006.01)
(Continued)

(52) U.S. Cl.
CPC .......... *F16K 11/048* (2013.01); *B60T 15/027* (2013.01); *F16K 27/0263* (2013.01); *F16K 31/423* (2013.01); *B60T 8/362* (2013.01)

(58) Field of Classification Search
CPC .......... Y10T 137/87917; F16K 11/048; F16K 27/0263; F16K 31/423; F16K 1/34;
(Continued)

(56) References Cited

U.S. PATENT DOCUMENTS

| 3,757,818 A | 9/1973 | Sweet |
| 6,199,587 B1 * | 3/2001 | Shlomi .............. F16K 31/082 137/625.5 |

(Continued)

FOREIGN PATENT DOCUMENTS

EP 0162286 A1 11/1985

OTHER PUBLICATIONS

International search report for patent application No. PCT/EP2016/078513 dated Feb. 9, 2017.

*Primary Examiner* — Kelsey E Cary
(74) *Attorney, Agent, or Firm* — Bachman & LaPointe, PC

(57) ABSTRACT

An electromagnetic valve device having an armature (18) designed such that it can move in an axial direction in a valve housing (10) in response to energising of a stationary coil (12) provided in the valve housing, and which interact with a first valve seat (22) associated with a fluid inlet connection (26) of the valve housing, wherein a first fluid flow path (36) is formed in the valve housing such that fluid flowing through the opened first valve seat can flow in order to actuate a plunger (32) provided axially or axially parallel to the armature (18) and moveable relative to same and to which a preloading force is applied, and the actuation causes a second valve seat (43) interacting with the plunger (32) to be opened to produce a fluid connection to a fluid working connection (42) of the valve housing, and wherein the valve housing has fastening structure (44, 46) in the form of at least one hole extending at an angle, to the axial direction, wherein the fluid inlet connection (26) and the working
(Continued)

connection (42), provided adjacent thereto, is formed on the same axial side of the valve housing in relation to the fastening structure.

18 Claims, 2 Drawing Sheets

(51) Int. Cl.
*B60T 15/02* (2006.01)
*F16K 11/048* (2006.01)
*F16K 27/02* (2006.01)
*B60T 8/36* (2006.01)

(58) Field of Classification Search
CPC ........ F16K 11/10; F16K 11/14; F16K 11/161; F16K 27/029; F16K 31/0606; F16K 31/0627; B60T 15/027; B60T 8/362
USPC .................................................... 137/625.65
See application file for complete search history.

(56) References Cited

U.S. PATENT DOCUMENTS

| | | | |
|---|---|---|---|
| 2003/0155020 A1* | 8/2003 | Hirota | F16K 31/423 137/625.43 |
| 2003/0193149 A1 | 10/2003 | Russell | |
| 2013/0025721 A1* | 1/2013 | Yun | F16K 31/082 137/613 |

* cited by examiner

ELECTROMAGNETIC VALVE DEVICE AND USE THEREOF

BACKGROUND OF THE INVENTION

The present invention relates to an electromagnetic valve device according to the preamble of the main claim. The present invention also relates to a system having a plurality of such electromagnetic valve devices, and the present invention relates to the use of such an electromagnetic valve device.

Electromagnetic valve devices according to the preamble of the main claim are generally known from the prior art and are used, for instance, for a wide variety of switching and control purposes, in particular in the form of pneumatic valves in the context of motor vehicles, in particular utility vehicles. In a conventional configuration, for instance in the form of a 3/2-way pneumatic valve having three fluid (pneumatic) connections and two switching positions, the armature means effect the switching movably in response to the energising of stationary coil means in the valve housing, in an otherwise known manner; in the present, more specific context of what are known as booster-assisted valves, an additional mechanical boosting function of the fluid circuit is implemented. Specifically, again in the manner in question, the controlled movement of the armature means effects the opening and closing of a first valve seat associated with the fluid inlet connection (pressure connection) of the valve housing. The open first valve seat allows the inflowing pneumatic fluid to enter a first fluid flow path, from where the fluid acts to actuate plunger means (as an essential assembly of the booster technology). In the process, the fluid pressure of the fluid flowing into the inlet connection overcomes a counter force (generated by a preloading spring or similar energy storage means, for instance) of the plunger means and moves them until a second valve seat (which has been closed by the plunger means until now) is opened. This then allows the fluid to flow to the fluid outlet connection.

In particular against the background of a larger realisable (fluid) cross-section, such booster technology for providing mechanical force assistance for electromagnetically operated valves has become established and proven effective.

However, the plunger means which are used therefor and are designed to interact with the second valve seat require additional axial installation space in the valve housing ("axial" in the context of the present application meaning a movement direction of the armature means, in this respect and preferably corresponding to an extension or longitudinal axis of the valve housing), in particular in case the plunger means, as an essential booster assembly, axially continue the armature means in the valve housing. Owing to restricted installation conditions, for instance in the context of motor vehicles, there is a need for optimisation and shortening, not least when a generic valve housing also has, in addition to the fluid inlet connection and fluid working connection (which usually project in a flange-like manner from the housing shell), fastening means which has at least one hole, but typically a pair of bores extending transversely to the axial direction for screw-fastenings or the like to be used for mounting purposes. As well as the installation space needed to accommodate the coil means (including the connector section which sits on the outside of the housing), there is thus an axial extent in need of optimisation.

In generic valve devices assumed to be generally known from the prior art, it is known, not least to optimise the axial dimension of a known valve housing, to provide the plunger means geometrically in the axial region of the fastening means; it is in particular known, if the fastening means are in the form of a pair of mutually parallel fastening bores, to accommodate the plunger means between said bores in the housing.

While this measure is favourable from a standpoint of an optimised axial extent of the valve housing, technical disadvantages are also produced: Firstly, the geometry of the fastening means (which is usually based on standardised holes or on standardised distances between the bores) limits an effective transverse extent of the plunger means, in this respect also a force application area for the fluid usable for the booster effect. Secondly, such a solution means that again the fluid inlet connection and the fluid working connection must be arranged on mutually opposite sides of the fastening means (that is, usually of the pair of fastening bores) in the axial extension direction of the valve housing, which in turn entails a negative effect on a total axial extent of the device.

SUMMARY OF THE INVENTION

The object of the present invention is therefore to improve an electromagnetic valve device according to the preamble of the main claim in terms of its geometric and functional properties, in the process allowing in particular an optimised (and thus widest possible in practice) extent of the plunger means in the valve housing and thus optimising the mechanical assistance effect of this booster technology without disadvantageously lengthening the total axial extent of the valve housing unnecessarily.

The object is achieved by the electromagnetic valve device having the features of the main claim; advantageous developments of the invention are described in the dependent claims. Additional protection is sought in the invention for the use of the electromagnetic valve device according to the invention as a 3/2-way pneumatic valve for switching and control applications in the field of motor vehicles, the field of utility vehicles being particularly favourable and preferred. Finally, protection is sought in the present invention for a valve system having a plurality of valve devices according to the invention which are connected to one another by means of the holes which each realise the fastening means and can thus form a compact, flexible, easily assembled and operationally reliable unit.

In an advantageous manner according to the invention, the design of the valve housing, of the plunger means, of the first fluid flow path to the plunger means and of the fluid connection to the fluid working connection ensures according to the invention that both the fluid inlet connection and the fluid working connection are on a common (axial) side in relation to the fastening means. This means firstly that, favourably for an optimised axial extent of the overall arrangement in the valve housing, it is possible to arrange the fluid inlet connection and the fluid working connection adjacently to each other, and further preferably to offset them radially and/or axially to each other, in a geometrically favourable and potentially space-saving manner. At the same time, this geometry allows the plunger means to be provided such that they can move axially in the region of the fluid inlet connection and fluid working connection, with the advantageous consequence that a maximum usable plunger width is limited only by an effective housing inner diameter or connection ducts provided therein and not, as in the prior art which is assumed to be known, by the substantially narrower geometry of the fastening means, which is defined by standardised fastening conditions and thus by fixed bore spacings provided. An advantageous consequence is also an optimised switching behaviour (which is boosted by the booster technology) of the device.

In the context of these specifications according to the invention, different preferred variants of the invention also allow the valve housing together with the fastening means formed thereon and the fluid connections to be adapted to different requirements and installation space conditions, so that valve devices which are simple to produce, suitable for series production and highly operationally reliable can be designed and configured for a wide variety of environments thanks to the present technology, in particular if the valve housing is divided in a preferred, modular manner into a first housing assembly designed to accommodate the coil means and an associated connector region provided for external contact and into a second valve housing assembly which can be attached axially to the first housing assembly and is designed to form the fluid connections and the fastening means.

The flange-like fluid connections which protrude laterally from a lateral surface of the preferably at least partially cylindrical housing (and sit as a single piece), specifically the fluid inlet connection and the fluid working connection, thus make it possible to adapt to different use conditions and to further optimise installation space: For instance, it is preferred to offset these fluid connections to each other in the radial direction, this radial offset, that is, an angle or distance formed between the connections in a plane perpendicular to the axial direction, can be provided such that the fluid inlet connection and the fluid working connection are mutually opposite in relation to the housing centre axis. Alternatively, according to a development, the two connections can be adjacent to each other in the radial plane, spaced by merely a minimal distance or can even overlap in the radial plane.

In this situation, an offset in the axial direction would then allow the most compact possible connection region of these two connections, which in this respect are then arranged obliquely in relation to an outer lateral surface of the valve housing.

In particular, the arrangement and orientation of the fluid connections relative to the fastening means having at least one hole, preferably a pair of mutually parallel bores, allows additional geometric design and development possibilities. For instance, it is favourable according to a preferred embodiment of the invention to provide an angular position of the fluid inlet connection and/or of the fluid working connection in the plane perpendicular to the axial direction, that is, in the radial plane, at right angles to the angular orientation of the hole, this measure in particular simplifying a connection or access to the fluid connections if, for instance in the context of the system according to the invention, a plurality of the valve housings according to the invention is connected by means of the fastening means and in the direction of the holes abutting one another and defining a mounting direction. This effect is also achievable if the angular offset is not exactly 90° but is preferably realised in a typical range between 70° and 110°.

A comparable optimisation possibility is provided by the geometric orientation of the hole and/or of at least one of the fluid connections relative to a lateral extent of a connector section which protrudes radially from the valve housing (and again preferably sits as a single piece thereon) and, again in a preferred development, can be provided on an end section, axially opposite the fastening means, of the valve housing. To make the electrical and pneumatic connections simple and uniform, it could correspondingly be preferred to form this connector section and at least one of the fluid connections flush or without an (angular) offset formed therebetween, in the radial plane, i.e. in the plane perpendicular to the axial direction.

A particularly preferred development of the invention, which again falls within the system concept of the invention as already discussed above but is claimed independently and has advantages, lies in providing the valve housing with an additional fluid connection which is connected to the fluid inlet connection such that it leads through to the fluid inlet connection and is thus permanently not influenced by the switching behaviour of the valve device. If this additional fluid connection is advantageously and as a development formed according to the invention in the region of the fastening means and further preferably formed in a manner extending parallel to an extension direction of the at least one hole in the fastening means, the advantageous possibility not only arises, when a plurality of valve housings (and correspondingly valve devices according to the invention formed therewith) are joined together within the meaning of the system according to the invention, of forming a continuous mechanical coupling or connection by means of the holes which can be oriented towards one another continuously, but also in this embodiment the likewise continuous (that is, crossing the valve housing) additional fluid inlet connections align with one another and allow a direct (fluid) connection to an adjacent fluid connection in each case. For the purpose of sealing and a pressure-tight design, additional suitable coupling means or the like to be adapted could be provided here, either as integrated sections on or in the housing or as additional assemblies which can be used as required.

Such a development is particularly elegant in that, in a preferred embodiment of the fastening means by means of a pair of holes which would then likewise realise a pair of connecting and fastening bores running parallel to each other, this additional fluid connection could then be provided centrally between the pair of holes, producing a likewise compact device which is simple to align and mount.

A further advantageous development of the invention for which protection is also sought independently in conjunction with the features of the preamble of the main claim, lies in the development embodied in dependent claim 10, according to which a ventilation path for ventilating a working space formed between the armature means and a core (core means) (preferably provided at the axial end in the valve housing) is created in a particularly favourable manner in design and production terms. Specifically, this ventilation, which according to demands which are often made of valve devices according to the invention (and generic ones), promotes venting at the axial end of the valve housing on the side of the fastening means, would be realised in that a necessary ventilation duct is split into multiple paths, and then a connection of these paths is produced in a particularly elegant manner in design and production terms by a cover assembly or cap assembly without the need for complex radially extending transverse ducts or similar formations in the valve housing. Specifically, this solution provides for a first ventilation path to be made in or on (e.g. on the outer side of) the core means, allowing a fluid flow parallel to the axial direction. A second ventilation path would then be provided, again at least partially parallel to the axial direction on or in the valve housing; this can be made in particular by a duct formed in the outer region, for instance. The particularly elegant design of a cover section or cap section as a separate assembly then allows these two ventilation paths to be connected in the end region or end face region of the valve housing (i.e. at the end of the core), without the need for a problematic radial formation in the housing itself. This role could be implemented, rather, by a groove or similar notch, which can be provided in the cap or cover or alternatively in the (in this case open) end region of the valve housing.

An electromagnetic valve device implemented in this manner is then suitable in a preferred manner for various, in particular pneumatic switching and controlling tasks in the motor vehicle field; again, utility vehicle technology defines preferred areas of use, but the invention is not limited to such a preferred use. Rather, the present invention is suitable for practically any area of use in which, under potentially restricted geometric installation conditions, dimensions, a fluid connection geometry and a fastening geometry of the valve housing should be optimised.

BRIEF DESCRIPTION OF THE DRAWINGS

Further advantages, features and details of the invention result from the following description of preferred exemplary embodiments, as well as on the basis of the drawings. In the figures.

DETAILED DESCRIPTION

Figure 1:
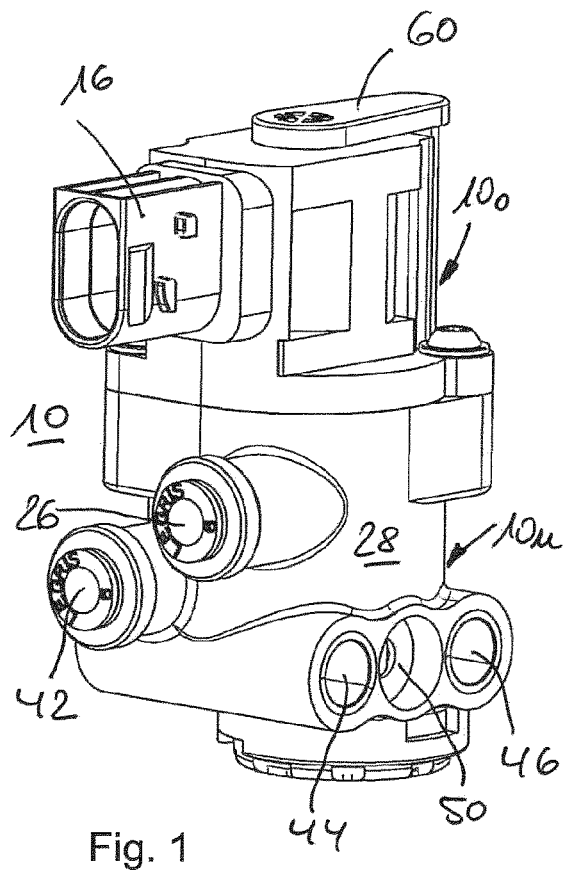
FIG. 1, FIG. 2 show perspective views of the electromagnetic valve device according to a first preferred embodiment of the present invention.

FIGS. 1 to 4 show different views of the electromagnetic valve device according to the invention in a first embodiment of the present invention. A valve housing 10 consisting of a housing assembly 10o (at the top in the drawing plane) for accommodating a stationary coil unit 12, which is held on a coil support 14 and can be electrically contacted via a connector section 16 which sits as a single piece on the housing, and of a lower housing assembly 10u is designed to accommodate and guide an armature unit 18 movable vertically in the drawing plane and thus in an axial direction. Specifically and in an otherwise known manner, the armature unit 18, which is preloaded by the action of a compression spring 20 against a first valve seat 22, closing the latter in a non-energised manner, is driven by the energising of the coil 12 by means of contacts shown schematically in the connector section 16. In an otherwise known manner, this energising results in an upward movement of the armature 18 against a stationary core unit 24, as a result of which the nozzle-like first valve seat 22 is opened. Said valve seat is connected to a fluid inlet 26 (to which pneumatic fluid can typically be applied at a pressure in the range between approx. 10 and approx. 15 bar), which protrudes in a flange-like manner laterally from the cylindrical lateral surface 28 of the lower valve housing assembly 10u.

Figure 3:
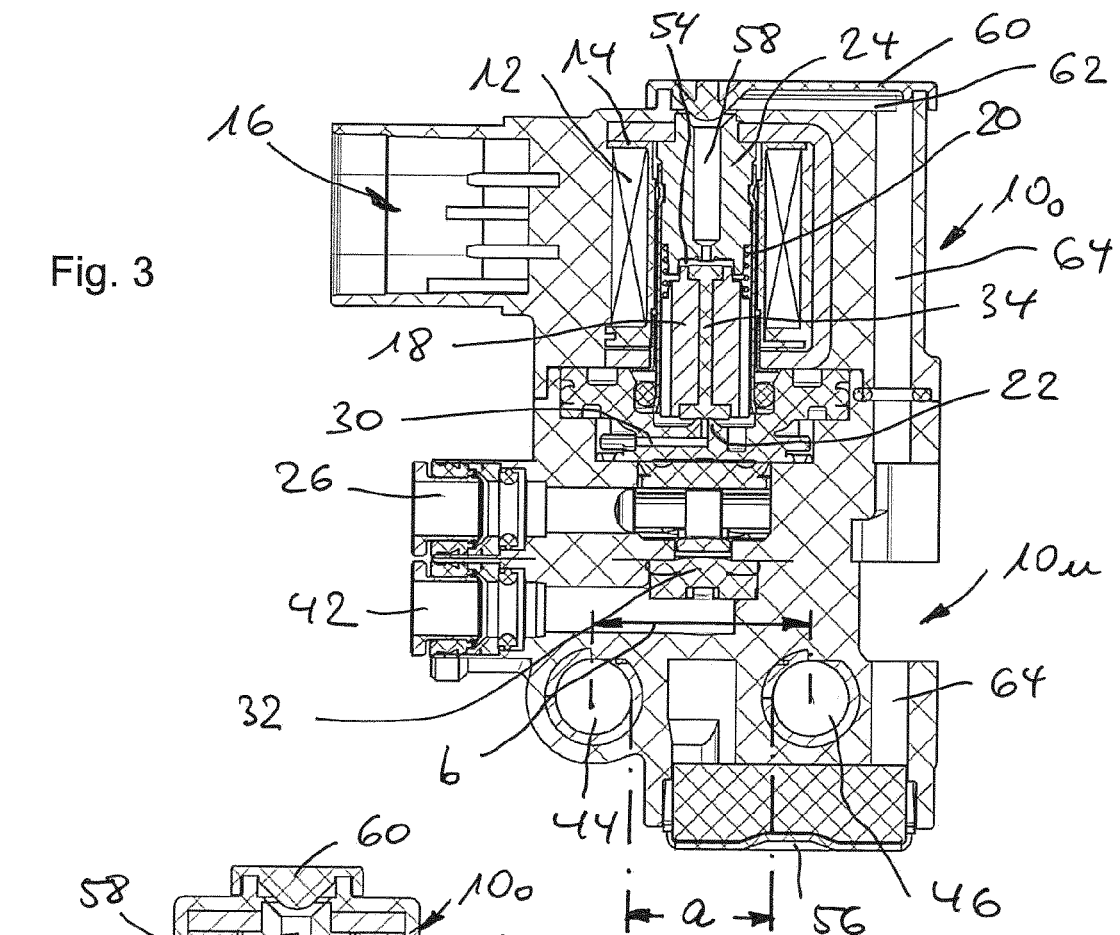
FIG. 3 shows a longitudinal section of the exemplary embodiment of FIG. 1 and FIG. 2 with a section line running in a stepped manner.

FIG. 3 shows a part of this fluid connection between the fluid inlet 26 and the nozzle-side, axially upwardly oriented outlet of the valve seat 22, in the form of a branch duct 30.

Figure 4:
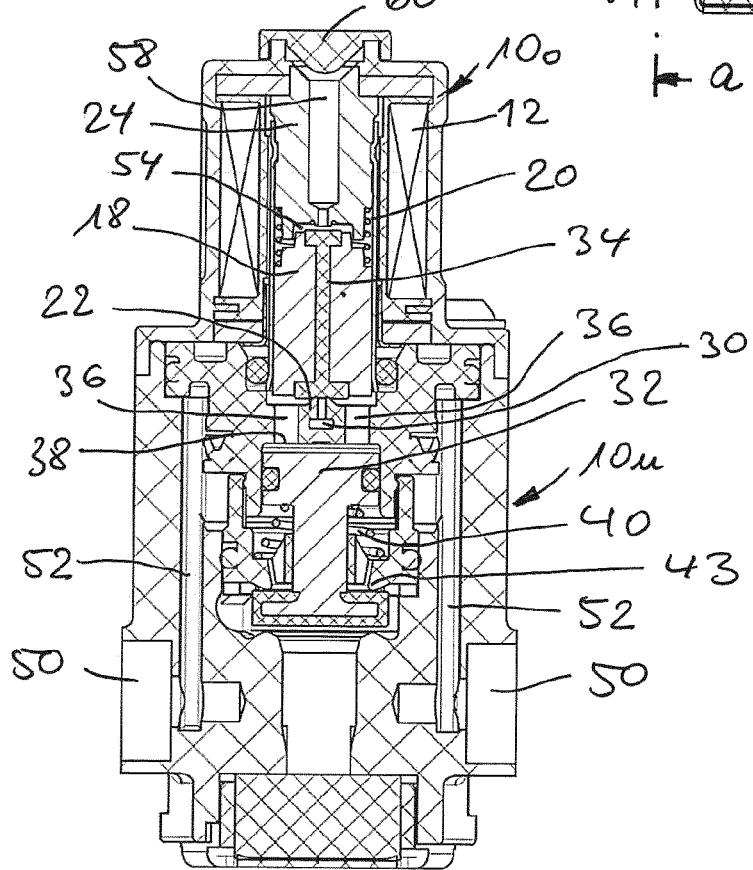
FIG. 4 shows a longitudinal section analogous to FIG. 3 but rotated 90° in the axial direction (running vertically in the drawing plane)

The electromagnet valve of the first exemplary embodiment shown in FIGS. 1 to 4 is provided with what is known as booster technology, which is primarily implemented by an axially movable plunger unit 32 and to which pneumatic fluid of the fluid inlet 26 can be applied by the effect of the switching process of the armature 18. When the armature 18 is attracted (i.e. when the coil 12 is energised) and the valve seat 22 is correspondingly open (the sectional views of FIGS. 3 and 4 shows a sealing section 34 in the armature body 18, said sealing body being inserted centrally, effective at both axial ends and consisting of polymer material), fluid entering through the inlet 26 and guided through the branch duct 30 can thus act via the open valve seat 22 and an adjacent duct section 36 on a transverse face 38, oriented upwards in the drawing plane, of the plunger unit 32. As can be seen in particular in the sectional view of FIG. 4, the latter is preloaded in an upward direction into the position of FIG. 4 by a compression spring 40, but the inflowing fluid pressure acting on 38 exceeds the counter pressure of the compression spring 40 so that the plunger 32 is moved downwards in the drawing plane under the action of the pneumatic fluid (with the armature 18 still attracted, i.e. upwardly resting against the core 24). This opens a fluid flow duct running from the duct section 36 to a fluid working connection 42 via a second valve seat 43, which is opened by the downward movement of the plunger, so that in this operating state the pneumatic fluid can flow to the working outlet 42 adjacent to the inlet 26 on the housing shell 28.

It is clear from a geometrical consideration of the valve housing 10 which can be seen in FIGS. 1 to 4 not only that the fluid connection pair 26, 42, in relation to the axial direction (i.e. the vertical axis in the drawing planes), is provided adjacent to each other and offset in the axial direction, but the connections 26, 42 also lie adjacent to each other in a radial plane (perpendicular to the axial direction). It is also clear that the fluid connection pair 26, 42, in relation to a pair of fastening bores 44, 46 which extend perpendicularly to the axial direction through the lower housing assembly 10u and are parallel to each other, is situated on one axial side, i.e. in the representation of the drawing plane, in each case above this pair of bores 44, 46. Also in relation to the extension direction of the bores 44, 46, the direction, leading out of the housing 10, of the pair of fluid connections 26, 42 runs orthogonally, i.e. at a 90° angle. Advantageously and as a development according to the invention, the lower housing assembly 10u, which is formed as a single piece and from a plastic material, accommodates or realises the fastening bores 44, 46 as well as the fluid connection pair 26, 42, so that with the booster assembly to be inserted suitably and the subsequent joining to the upper housing assembly 10o (with the pre-mounted magnetic valve technology), an efficient way of manufacturing the overall arrangement, which is potentially suitable for series production, is created.

The sectional views of FIGS. 3 and 4 also in particular show the geometric installation space advantages achieved by the invention with regard to an achievable cross-sectional or area dimension in particular of the plunger unit 32: Specifically, it is advantageously achieved by the present invention that, for instance in relation to a minimum radial distance a between the bore pair 44, 46 (that is, the shortest distance between the inner walls, facing each other, of these bores), a diameter of the actuation face 38 of the plunger unit 32 is at least 0.7, in implementable practice can be up to 0.8 and higher. Likewise and as a supplementary or alternative geometric consideration for this advantage according to the invention, the ratio of the diameter (or of the extent of the radial area) of the face 38, in relation to the centre axis section b of the parallel bores 44, 46, is at least 0.4, but in preferred embodiments this distance is usually above 0.5, further preferably even above 0.6.

Figure 2:
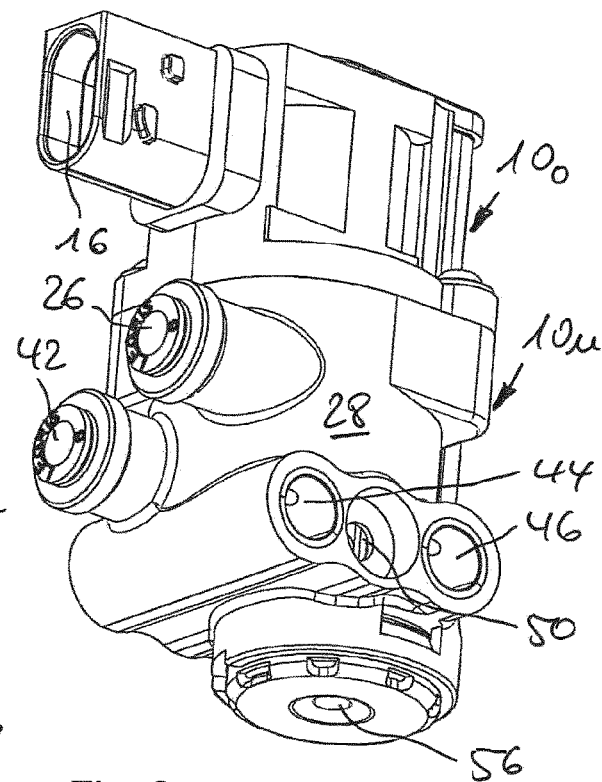

In particular FIGS. 1, 2 and 4 also show that in the region of the fastening means 44, 46, more precisely between the bore pair 44, 46 and extending parallel to them, there is an additional fluid connection 50 which is connected permanently to the fluid inlet connection 26 by means of the vertical upward ducts 52 shown in FIG. 4 and other connecting ducts not shown in the figures; this allows a fluid pressure of fluid entering the pressure inlet connection 26 also to be applied at the additional fluid connection 50—on both sides of the housing—so that, in particular of a plurality of valve housings 10 are linked or mounted on one another by means of aligned fastening bores 44, 46, continuous conduction or transfer of the pressure fluid via the additional connections 50 is made possible. If required, additional sealing bodies (not shown in the figures) would then seal such a connection; in the event of an isolated use of a single valve (or of a single valve body 10), the connections 50 would then be closed in a pressure-tight manner by means which are not described in more detail.

The first embodiment of the invention shown in FIGS. 1 to 4 illustrates how a working space 54 which is delimited between the core 24 and the armature 18 (and would then be closed by the activated, i.e. upwardly moved armature 18 when the coil 12 is energised) is vented, specifically towards a venting outlet 56 in the bottom. In a particularly elegant manner in terms of manufacturing and design, this venting takes place firstly through a bore 58 provided axially in the core 24, as the first ventilation path which opens into an again axially parallel duct 64 formed as a second ventilation path in the edge of the interior of the housing 10, by means of a transverse groove 62 formed in a cover assembly 60 which is provided separately from the housing 10 and can be placed onto the end face of the housing. This second ventilation path 64 is then opened to the bottom (in this respect in relation to the housing 10, at the end opposite the cover 60) venting outlet 56. In this manner, the frequently existing requirement of venting the armature space at the bottom, i.e. at an end face section under the fastening means 44, 46, can be implemented favourably.

In an elegant manner in production terms, the cover assembly 60 (cap) can for example be connected preferably non-detachably to the upper end face of the housing 10 by adhesive bonding, (ultrasonic) welding or similar connecting methods.

Figure 5:
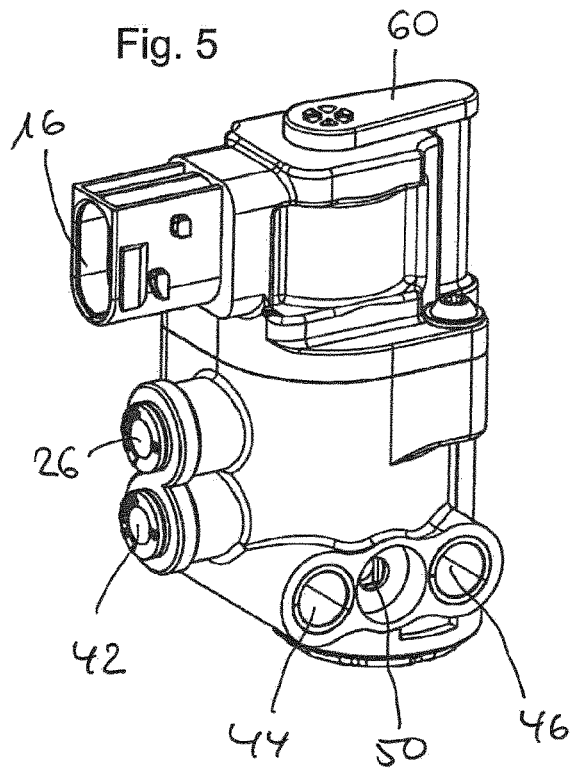
FIG. 5, FIG. 6 show two alternative embodiments of the invention as alternatives to the first exemplary embodiment of FIGS. 1 to 4 with a modified arrangement geometry of the fluid inlet connection and of the fluid working connection.
Figure 6:
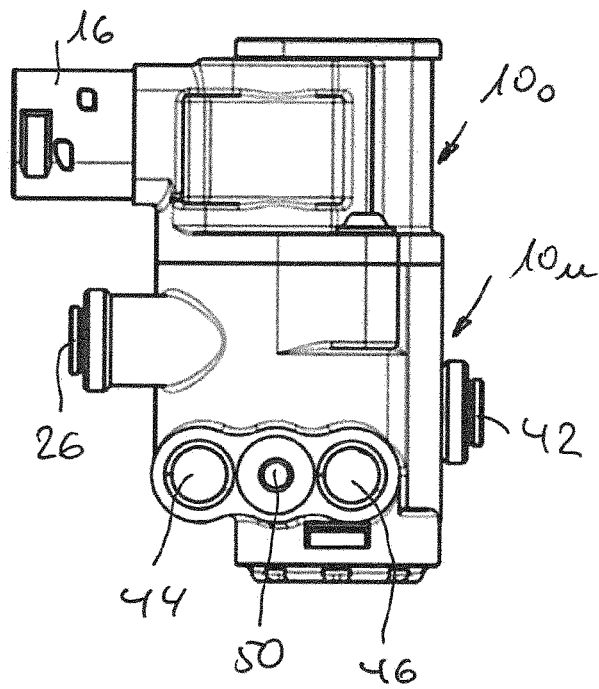

FIGS. 5 and 6 show, non-exhaustively, further geometric design variants for arranging the pair of fluid connections 26, 42 relative to the fastening means 44, 46 and to the connector section 16. Whereas in the exemplary embodiment of FIG. 5 the pair of connections 26, 28 together with the connection 16 are aligned in a direction parallel to the axial direction, again offset by 90° in the radial plane, in the alternative exemplary embodiment of FIG. 6 the fluid inlet connection 26 is offset by 180° in the radial direction from the fluid working connection 42 and there is also an offset in the axial direction. This arrangement is again orthogonal to the direction defined by the fastening bore 44, 46 of the fastening means.

The invention claimed is:

1. An electromagnetic valve device having armature means (18), wherein the armature means moves in an axial direction in a valve housing (10) in response to the energising of stationary coil means (12) provided in the valve housing, and interacts with a first valve seat (22) associated with a fluid inlet connection (26) of the valve housing, wherein a first fluid flow path (36) is formed in the valve housing such that fluid flowing through the opened first valve seat can flow in order to actuate plunger means (32), wherein a preloading force is applied to the armature means, and the actuation causes a second valve seat (43) interacting with the plunger means (32) to be opened to produce a fluid connection to a fluid working connection (42) of the valve housing, and wherein the valve housing has fastening means (44, 46) in the form of at least one hole extending at an angle to the axial direction wherein the fluid inlet connection (26) and the working connection (42) are formed on the same axial side of the valve housing in relation to the fastening means, wherein the armature means in the valve housing are assigned stationary core means (24) axially opposite the first valve seat, wherein the core means together with the armature means delimit a ventilated working space (54), wherein the ventilation is implemented by a first ventilation path (58) which runs on and/or in the core means, a second ventilation path (64) which is defined entirely within the valve housing and runs at least partially parallel to the axial direction in the valve housing, and by a connecting path (62) which is formed at the end of the core means and/or of the valve housing and connects the first and second ventilation paths, and wherein the connecting path is implemented by means of a cap assembly and/or cover assembly (60) which can be connected to the axial end of the valve housing.

2. The device according to claim 1, wherein a pneumatic fluid can be applied to the fluid inlet connection (26) in the form of a pneumatic pressure connection in such a manner that a fluid pressure of the pneumatic fluid can overcome a mechanical, restoring force acting on the plunger means (32) when the first valve seat (22) is opened.

3. The device according to claim 1, wherein the fluid inlet connection and fluid working connection, which are each flange-like and sit as a single piece on the housing, are offset relative to each other in the axial direction and/or radially, and wherein the housing is at least partially cylindrical.

4. The device according to claim 3, wherein the fluid inlet connection and fluid working connection are formed on mutually opposite sides of the valve housing in relation to a valve housing longitudinal axis corresponding to the axial direction.

5. The device according to claim 3, wherein the fluid inlet connection and fluid working connection are formed on the valve housing adjacently, either without a radial offset or with a radial offset and an axial offset.

6. The device according to claim 3, wherein a radial direction of the fluid inlet connection and/or fluid working connection, in relation to a radial direction of the hole of the fastening means, has an angle offset of zero or an angle offset in the range between 70° and 110°.

7. The device according to claim 1, wherein the valve housing, in an end section axially opposite the fastening means, has a connector section (16) which can be connected a power supply of the coil means and has an orientation extending parallel to the fluid inlet connection and/or fluid outlet connection and/or at right angles an extension direction of the hole (44, 46).

8. The device according to claim 1, wherein the fastening means is assigned an additional fluid connection (50) of the valve device which is permanently connected to the fluid inlet connection.

9. The device according to claim 8, wherein the additional fluid connection (50) is formed and oriented parallel relative to the fastening means, in such a manner that the respective additional fluid connections can be connected to each other in a pressure-tight manner, with the use of coupling means, when there is a plurality of valve housings, connected to one another by means of the fastening means, of a plurality of valve devices connected to one another.

10. The device according to claim 8, wherein the fastening means have a pair of holes (44, 46) formed adjacently to each other and oriented parallel to each other.

11. The device according to claim 1, wherein the diameter and/or the maximum cross-sectional width of an actuation face (38) on the armature side of the plunger means (32), in relation to a centre axis spacing (b) of a pair of parallel holes (44, 46) realising the fastening means is at least 0.4, and/or the diameter and/or the maximum cross-sectional width of the actuation face (38) on the armature side of the plunger means (32), in relation to a minimum radial distance (a) of the pair from the parallel holes (44, 46) of the fastening means is at least 0.7.

12. The electromagnetic valve device according to claim 1, wherein the valve housing has a multi-piece form and the fluid inlet connection, the working connection and the fastening means are provided on or in a common housing part of the valve housing.

13. The electromagnetic valve device according to claim 12, wherein the fluid inlet connection, the working connection and the fastening means are provided on or in a common, single-piece housing part of the valve housing.

14. The device according to claim 1, wherein the plunger means (32) are provided axially or axially parallel to the armature means (18).

15. The device according to claim 1, wherein the hole extends transversely to the axial direction.

16. The device according to claim 1, wherein the working connection (42) is provided adjacent to the fluid inlet connection (26).

17. The device according to claim 1, wherein the diameter and/or the maximum cross-sectional width of an actuation face (38) on the armature side of the plunger means (32), in relation to a centre axis spacing (b) of a pair of parallel holes (44, 46) realising the fastening means is at least 0.5, and/or the diameter and/or the maximum cross-sectional width of the actuation face (38) on the armature side of the plunger means (32), in relation to a minimum radial distance (a) of the pair from the parallel holes (44, 46) of the fastening means is at least 0.8.

18. An electromagnetic valve device having armature means (18) wherein the armature means moves in an axial direction in a valve housing (10) in response to the energising of stationary coil means (12) provided in the valve housing, and interacts with a first valve seat (22) associated with a fluid inlet connection (26) of the valve housing, wherein a first fluid flow path (36) is formed in the valve housing such that fluid flowing through the opened first valve seat can flow in order to actuate plunger means (32), wherein a preloading force is applied to the armature means,
    and the actuation causes a second valve seat (43) interacting with the plunger means (32) to be opened to produce a fluid connection to a fluid working connection (42) of the valve housing,
    and wherein the valve housing has fastening means (44, 46) in the form of at least one hole extending at an angle to the axial direction wherein
the fluid inlet connection (26) and the working connection (42) are formed on the same axial side of the valve housing in relation to the fastening means, wherein the armature means in the valve housing are assigned stationary core means (24) axially opposite the first valve seat, wherein the core means together with the armature means delimit a ventilated working space (54), wherein the ventilation is implemented by a first ventilation path (58) which runs on and/or in the core means, a second ventilation path (64) which runs at least partially parallel to the axial direction in the valve housing, and by a connecting path (62) which is formed at the end of the core means and/or of the valve housing and connects the first and second ventilation paths, and wherein the connecting path is implemented by means of a cap assembly and/or cover assembly (60) which can be connected to the axial end of the valve housing, wherein the valve housing has a housing edge, wherein the cap assembly has an inner ridge extending away from the cap assembly and an outer ridge extending away from the cap assembly, the inner ridge and the outer ridge defining a groove, and wherein the cap assembly is connected to the valve housing by positioning the housing edge in the groove.

\* \* \* \* \*